Jan. 13, 1948. W. E. ROSS 2,434,437
PROCESS FOR ISOMERIZATION OF PARAFFIN HYDROCARBONS
WITH FLUID FRIEDEL-CRAFTS CATALYST AND ADDED
DICYCLIC NAPHTHENIC HYDROCARBONS
Filed March 15, 1944
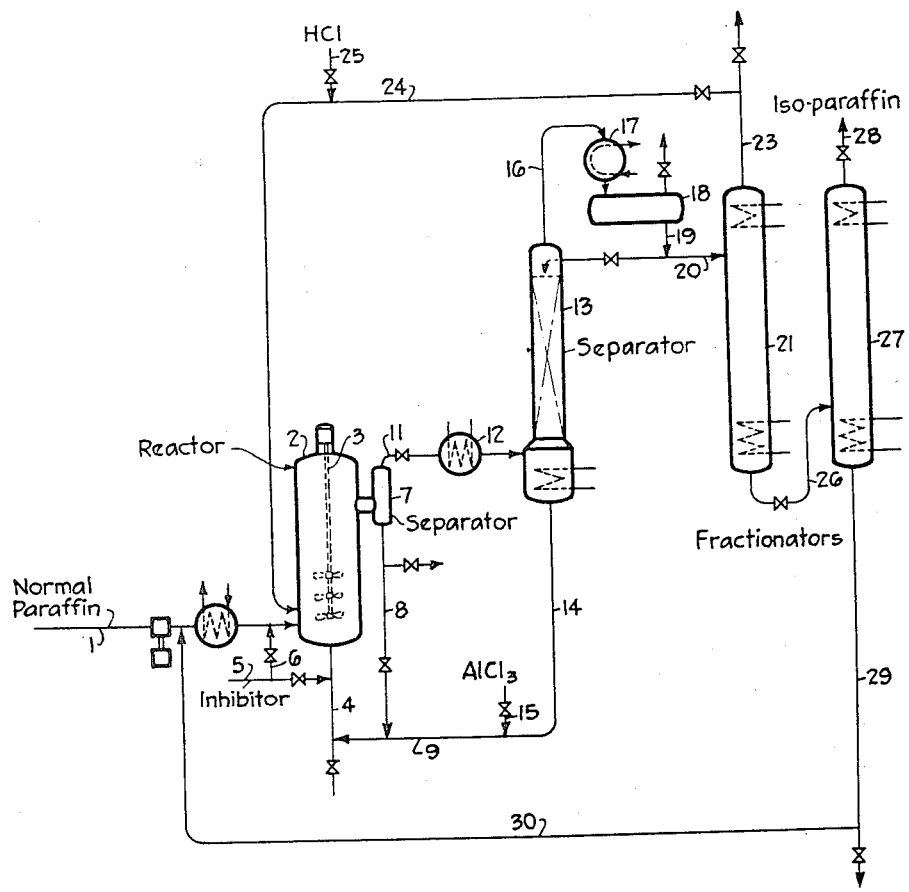
Inventor: William E. Ross
By his Agent:

Patented Jan. 13, 1948

2,434,437

UNITED STATES PATENT OFFICE 2,434,437

PROCESS FOR ISOMERIZATION OF PARAFFIN HYDROCARBONS WITH FLUID FRIEDEL-CRAFTS CATALYST AND ADDED DICYCLIC NAPHTHENIC HYDROCARBONS

William E. Ross, Berkeley, Calif., assignor to Shell Development Company, San Francisco, Calif., a corporation of Delaware Application March 15, 1944, Serial No. 526,843

9 Claims. (Cl. 260—683.5)

This invention relates to the catalytic isomerization of paraffinic hydrocarbons and relates more particularly to the catalytic isomerization of paraffinic hydrocarbons having from five to ten carbon atoms to the molecule and hydrocarbon mixtures comprising them.

The isomerization of hydrocarbons having at least four carbon atoms to the molecule is a step of prime importance, essential as a preliminary and often intermediate operation not only in the production of highly improved motor fuels and components thereof but in the production of many organic derivatives of these paraffins. Of particular importance is the conversion of paraffinic hydrocarbons of straight or less branched chain structure to an isomeric form thereof having branched or more highly branched structure, respectively.

Catalysts particularly effective in catalyzing the paraffin isomerization reaction are those comprising metal halides of the Friedel-Crafts type. Of these metal halides those comprising a halide of aluminum, for example aluminum chloride and/or aluminum bromide, are generally preferred. Available isomerization catalysts may be conveniently subdivided into two groups, namely a solid type and a fluid type. The solid type catalysts comprise the aluminum halide per se in pieces or chunks optionally in the presence of admixed solid inert material, and the supported catalysts containing the metal halide in finely divided form deposited or adsorbed on a suitable solid diluent or support material, preferably of an adsorbent nature such as charcoal, activated alumina, bauxite, etc. The fluid type isomerization catalysts vary considerably from one to another. They comprise the metal halides of the Friedel-Crafts type, for example, an aluminum halide as a suspension or solution in a suitable liquid vehicle. The liquid vehicle may comprise a hydrocarbon or hydrocarbon mixture which may be a part of the material treated. Other carrying liquids may comprise a hydrogen halide such as hydrogen chloride; alkyl halides; SO₂, etc., or any other liquid, inert at the operating conditions. Another type of fluid isomerization catalyst comprises the aluminum halide as a solution or suspension in a suitable molten salt or mixture of molten salts. The molten salts may simply function as the carrying medium or they may act as catalyst modifiers or as separate catalyst components to form a true mixed molten salt catalyst. Particularly suitable molten salt type aluminum halide-containing catalysts comprise a molten mixture of aluminum halide and a halide of antimony, for example, a melt comprising aluminum chloride dissolved in antimony trichloride; a molten mixture of an aluminum halide and at least one halide salt of an alkali or alkaline earth metal, etc. Still another type of fluid aluminum halide-containing catalyst comprises a fluid organo-aluminum halide complex obtained by mixing an aluminum halide with an organic compound under conditions resulting in the interaction of the aluminum halide with the organic compound and/or decomposition product thereof.

It is to be understood that the invention is in no wise limited to the use of a particular type of catalyst comprising a metal halide of the Friedel-Crafts type nor by the method of its preparation.

The particular catalyst used for the isomerization of a paraffin hydrocarbon, or hydrocarbon mixture comprising it, depends somewhat upon the conditions used and upon the particular hydrocarbon or hydrocarbon mixture being treated. The isomerization of butanes may be carried out in the liquid, vapor or mixed phase in the presence of a catalyst of either the fluid or solid type. Due to the relative stability of butanes under isomerizing conditions excellent results are obtained in vapor phase operation in the presence of a solid type catalyst. Paraffin hydrocarbons having more than four carbon atoms to the molecule, and fractions comprising them, are generally preferably isomerized with an isomerization catalyst of the fluid type.

An inherent disadvantage in the isomerization of hydrocarbons with the aid of Friedel-Crafts type catalyst presenting serious difficulties in efficient operation of the process on a practical scale, is attributable to the fact that these catalysts are also effective in catalyzing the decomposition of hydrocarbons. In the isomerization of a more stable hydrocarbon, it is sometimes possible to favor the isomerization reaction by a judicious selection of temperature and pressure conditions to such a degree that conversion to the desired isomer is attained with a minimum of hydrocarbon decomposition. Processes are presently in use which enable the efficient conversion of butane to isobutane with but little undesired side reactions. Many other hydrocarbons, such as, for example, the saturated open chain hydrocarbons having five or more carbon atoms to the molecule are, however, particularly prone to undergo decomposition in the presence of isomerization catalysts. Even in some of these cases, the undesirable side reaction can be suppressed to some degree by the use of sufficiently mild operating conditions. Such conditions often will be so mild, however, as to make the attainment of conversions and yields indicative of a practical operation impossible. On the other hand, to use temperature conditions more favorable to the isomerization reaction in the treatment of these hydrocarbons in the absence of agents capable of suppressing hydrocarbon decomposition generally results in the presence of the hydrocarbon decomposition reaction to a degree precluding efficient operation of the process.

By the term "decomposition" as used throughout this specification and the attached claims is meant the rupture of carbon to carbon and/or carbon to hydrogen bonds of the hydrocarbon molecule to result in the formation of hydrocarbons of lower molecular weight than the hydrocarbon treated. The detrimental effect of the hydrocarbon decomposition reaction upon the isomerization process manifests itself in many ways, any one of which is generally sufficient to render the process impractical. This reaction causes the loss of substantial amounts of the charge by converting it to materials other than an isomeric form of the material treated possessing the same number of carbon atoms to the molecule. This loss in the treatment of the more readily degraded hydrocarbons such as pentane, methyl pentane, and the like, in many of the processes utilized heretofore, at temperatures enabling the attainment of even a moderate rate of isomerization, often is so great as to occasion the loss of the greater part of the material charged. A still greater detrimental effect occasioned by the hydrocarbon decomposition in the presence of the Friedel-Crafts type catalysts is the rapid deterioration of the catalyst brought about by the products of this reaction.

Much effort has been expended in attempts to control the tendency of the Friedel-Crafts type catalysts, and particularly the aluminum halides, to catalyze the decomposition of hydrocarbons in non-destructive hydrocarbon conversion processes to thereby enable the desired reaction to predominate. Good results have been obtained in certain processes by the maintenance of a high partial pressure of hydrogen in the reaction zone. The use of this gas, particularly at the high pressures usually required to render it effective, increases installation and operating costs considerably and introduces difficulties and hazards of operation which often act as a serious deterrent to practical operation.

Though substantial suppression of hydrocarbon decomposition in the isomerization of paraffinic hydrocarbons in the presence of aluminum halide catalysts may be obtained by the inclusion of specific amounts of mononuclear cycloparaffins having from five to eight carbon atoms to the molecule to the charge, these materials possess the disadvantage of often presenting serious difficulties in their recovery from the reaction products. Such recovery is generally essential not only because it is economically desirable to recycle the inhibitor, but because the presence of the material renders the product unsuitable for many purposes for which the product is originally destined. Separation of the inhibitor where possible by even such methods as fractionation increases the cost of operation and its elimination to at least a substantial degree is highly desirable. Cycloparaffins and paraffins, the boiling points of which lie close to one another, can, however, not readily be separated on a practical scale by simple fractionating means and more elaborate and costly steps must be resorted to. This limits to no small degree the number of low boiling mononuclear cycloparaffins which can be used in the treatment of paraffinic hydrocarbons having from five to ten carbon atoms to the molecule and hydrocarbon fractions comprising them.

It is an object of the present invention to provide an improved process for the more efficient isomerization of paraffinic hydrocarbons with the aid of catalysts comprising a metal halide of the Friedel-Crafts type wherein the above difficulties are substantially completely obviated.

It is an object of the present invention to provide an improved process for the more efficient isomerization of paraffinic hydrocarbons with the aid of catalysts comprising a metal halide of the Friedel-Crafts type in the absence of any substantial hydrocarbon decomposition.

Another object of the invention is the provision of a process for the conversion of pentane to isopentane with the aid of a catalyst comprising a metal halide of the Friedel-Crafts type in the absence of any substantial hydrocarbon decomposition.

Another object of the invention is to provide an improved process enabling the more efficient treatment of paraffinic hydrocarbons having from five to ten carbon atoms to the molecule at isomerizing conditions in the presence of a Friedel-Crafts type isomerization catalyst in the absence of any substantial hydrocarbon decomposition. Other objects and advantages of the invention will become apparent from the following detailed description thereof.

It has now been found that the isomerization with the aid of Friedel-Crafts type catalysts of paraffinic hydrocarbons, particularly those having from five to ten carbon atoms to the molecule is obtained with substantially improved efficiency, in the absence of any substantial hydrocarbon decomposition and in the absence to at least a substantial degree of the difficulties heretofore encountered in the use of hydrocarbon decomposition suppressors, by maintaining within the system of the process a saturated dicyclic alicyclic hydrocarbon. In accordance with the process of the invention an isomerizable paraffinic hydrocarbon, optionally in admixture with one or more other hydrocarbons capable or not of undergoing isomerization under the conditions of execution of the process and/or in the presence of added inert gaseous material, is contacted with an isomerization catalyst comprising a metal halide of the Friedel-Crafts type at isomerizing conditions in the presence of the saturated dicyclic alicyclic hydrocarbon.

The invention is applied with particular advantage to the isomerization of the more readily degraded paraffinic hydrocarbons such as, for example, the straight or branched chain paraffins having from five to ten carbon atoms to the molecule and the narrow boiling hydrocarbon fractions predominating in one or more of these paraffins, obtained, for example, by fractionation of such material as petroleum and its fractions, natural gasoline, distillate products obtained by catalytic or pyrogenic treatment of crude oils, distillate fractions thereof or other available carbonaceous materials. As stated above, these more readily degraded paraffinic hydrocarbons and hydrocarbon fractions comprising them, are generally preferably isomerized with an isomerization catalyst of the fluid type. The use of the saturated dicyclic alicyclic hydrocarbon in the system when utilizing these catalysts not only presents advantages facilitating the use of these catalysts but their presence in the reaction zone simultaneously eliminates any substantial degree of hydrocarbon decomposition normally encountered in their absence.

A signal advantage in the use of the saturated dicyclic alicyclic hydrocarbons resides in the fact that they are liquid at temperatures at which the isomerization is conducted and yet possess a minimum boiling range considerably above that of even those paraffinic hydrocarbons having ten carbon atoms to the molecule. The process of the invention thus enables the isomerization of the more readily degraded hydrocarbons, and fractions comprising them not only in the absence of any substantial hydrocarbon decomposition but in the absence of the difficulties heretofore encountered in the use of materials as suppressors which are gaseous, or in the vapor state, at the conditions of execution of the process and particularly those whose boiling range lies within or close to that of the hydrocarbons being isomerized. The fact that there is no need in the present process for vaporizing any substantial amount of the saturated dicyclic alicyclic hydrocarbon at any time during the process results in a substantial saving with regard to heat requirements and condensing means over processes comprising the use of more volatile materials as hydrocarbon decomposition suppressors. The saturated dicyclic alicyclic hydrocarbons, it is to be pointed out, do not undergo any appreciable decomposition under the isomerization conditions of the process and they have the desirable feature of possessing appreciable solubility in the fluid type catalysts, thereby assuring their presence at all times in the body of the catalyst mass.

Of the saturated dicyclic alicyclic hydrocarbons suitable for use in the process of the invention, those comprising only pentamethylene and hexamethylene rings are preferred and particularly those having from ten to fourteen carbon atoms to the molecule. Since large alkyl side chains are cleaved more readily from the cyclic ring than short side chains in the presence of Friedel-Crafts type catalysts, the use of dicyclic alicyclic hydrocarbons having long side chains are generally not preferred. Of the suitable binuclear hydrocarbons which have side chains, those containing not more than two carbon atoms in the longest unbroken side chain are generally more desirable. Suitable binuclear alicarbocyclic hydrocarbons comprise; for example, decalin, methylcyclopentyl cyclohexane, cyclohexyl cyclohexane, di-methylcyclohexane, di-dimethylcyclopentane, di-methyl cyclopentyl, etc. Decalin (decahydronaphthalene), cyclohexyl cyclohexane and cyclohexyl lower alkyl cyclohexanes, are particularly desirable not only because they are highly effective in suppressing hydrocarbon decomposition in the presence of the isomerization catalysts but because of their relatively high boiling range and stability under the conditions of execution of the process, thereby rendering their use in conjunction with the fluid type catalysts especially advantageous. By the term "lower alkyl" as used in the expression cyclohexyl lower alkyl cyclohexanes is meant alkyl radicals containing from one to three carbon atoms inclusive.

Isomerization of the hydrocarbons in accordance with the invention is executed in the temperature range of, for example, from about room temperature to about 150° C. It is to be pointed out that operating temperatures have been largely limited by the scope of the accompanying decomposition reaction and that consequently the present invention enables efficient operation at somewhat higher temperatures than possible heretofore in the absence of hydrocarbon decomposition suppressors. The isomerization reaction may be executed at subatmospheric, atmospheric, or superatmospheric pressures. In the case of liquid phase operation a sufficiently high superatmospheric pressure is, of course, maintained to keep at least a substantial part of the reactants in the liquid phase.

The isomerization is preferably executed in the presence of a hydrogen halide promoter, such as, for example, hydrogen chloride. The amount of hydrogen chloride used may vary widely in accordance with operating conditions. In general an amount of hydrogen chloride equal to from about 0.3% to about 40% of the hydrocarbon charge is found to be sufficient. Higher proprotions of the hydrogen chloride may, however, be used.

The amount of the binuclear alicyclic hydrocarbon to be maintained within the system of the process may vary considerably within the scope of the invention, depending upon the nature of the hydrocarbon or hydrocarbon fraction being isomerized, the specific catalyst and operating conditions used. At times, it is desirable to maintain a greater quantity of the dicyclic alicyclic hydrocarbon in the system than that required solely for the purpose of suppressing any substantial hydrocarbon decomposition. This is resorted to for the purpose of attaining the advantageous effect of the presence of such larger quantity, in facilitating catalyst flow, control of catalyst temperature, and suppression of catalyst entrainment. Thus the quantity of the binuclear cycloparaffin maintained in the system may range from about 0.1% to as high as about 20% by weight of the fluid catalyst. When suppression of hydrocarbon decomposition is the predominating effect desired, addition of the binuclear alicyclic in amounts of from about 0.1% to about 10%, and preferably from about 0.2% to about 5%, by weight of the fluid catalyst are generally satisfactory. The binuclear alicyclic hydrocarbon may be added directly to the charge or may be introduced separately into the reaction zone. It may be added as such or in any other form comprising for example, its solution or suspension in, or its admixture with a suitable medium. The addition may be made continuously or intermittently during the course of the operation.

The isomerization may be executed in any suitable type of apparatus enabling efficient contact of catalyst and reactants. The reaction zone may comprise a reactor of enlarged cross-sectional area provided with suitable stirring means and/or a zone of restricted cross-sectional area such as, for example, an externally heated elongated coil. Reactor effluent comprising isomerized hydrocarbons, unconverted hydrocarbons, hydrogen halide promoter, entrained catalyst and binuclear cycloparaffin is introduced into a catalyst separating zone. The catalyst separating zone in liquid phase operation generally comprises a preliminary phase separator wherein a liquid hydrocarbon phase is separated from a catalyst phase. The catalyst phase comprising some of the binuclear cycloparaffin is recycled to the reaction zone. Though substantial catalyst separation from reaction products is thus accomplished, the separation is, nevertheless, usually insufficient to remove all catalyst from the hydrocarbon product. The hydrocarbon layer is therefore generally sent to a product vaporizing zone wherein hydrocarbons comprising isomerized hydrocarbons, unconverted material and hydrogen halide are separated as a vapor product from a liquid fraction comprising catalyst and the binuclear cycloparaffin. The liquid fraction is recycled to the reaction zone. The vapor fraction is passed to a fractionating system wherein separation of products is effected and from which unconverted material and hydrogen halide is recycled to the reaction zone.

In the attached drawing, forming a part of the present specification, the single figure shows a more or less diagrammatical, elevational view of one form of apparatus suitable for executing the process of the invention.

Referring to the drawing, a hydrocarbon to be converted, for example an isomerizable paraffin such as normal pentane, is introduced into a reaction zone by means of a valved line 1. The reaction zone is represented by a reactor 2 provided with suitable stirring means 3. Within reactor 2 the pentane charge is contacted with a suitable fluid isomerization catalyst containing a hydrocarbon decomposition suppressing amount of a saturated dicyclic alicyclic hydrocarbon. A suitable fluid catalyst comprises, for example, a solution of aluminum chloride in molten antimony trichloride. The catalyst is introduced into reactor 2 by means of valved line 4. The hydrocarbon decomposition inhibitor such as for example decalin, is introduced into the system by means of line 5 leading into line 4. If desired, at least a portion of the decalin may be introduced into charge line 1 by means of valved line 6. A hydrogen halide promoter, such as hydrogen chloride, is introduced into reactor 2 by means of line 24.

Isomerizing conditions of temperature and pressure are maintained within reactor 2 to effect the conversion of normal pentane to isopentane in the absence of any substantial amount of hydrocarbon decomposition.

Effluent comprising isopentane, unconverted normal pentane, fluid catalyst, decalin and hydrogen chloride is passed from reactor 2 into a first separator 7. Within separator 7 a liquid layer comprising fluid catalyst and decalin is separated from a supernatant layer comprising pentanes, entrained catalyst and decalin, by stratification. The liquid layer is withdrawn from separator 7 and passed through valved lines 8, 9, and 4 into reactor 2.

The upper liquid layer is withdrawn from separator 7 and passed through valved line 11 and indirect heat exchanger 12 into a second separator. The second separator may suitably comprise a product vaporizer or still 13. Within second separator 13 a liquid fraction comprising fluid catalyst and decalin is separated from a vapor fraction comprising pentanes free of any substantial amount of catalyst and decalin. The liquid fraction comprising decalin and fluid catalyst is passed from still 13 through lines 14 and 4 into reactor 2. Additional aluminum chloride may be added to the catalyst by means of valved line 15. The vapor fraction is passed from separator 13 through line 16 and cooler 17 into an accumulator 18.

Normal pentane and isopentane, as well as hydrogen chloride, are passed from accumulator 18 through lines 19 and 20 into a fractionator 21.

Within fractionator 21, a vapor fraction comprising hydrogen chloride is separated from a liquid fraction comprising normal pentane and isopentane. The vapor fraction is recycled at least in part from fractionator 21 through valved lines 23 and 24 to reactor 2. Make-up hydrogen chloride is introduced into the system by means of valved line 25. Liquid comprising normal pentane and isopentane is passed from fractionator 21 through line 26 into fractionator 27. Within fractionator 27 a vapor fraction comprising isopentane is separated from a liquid fraction comprising normal pentane. The vapor fraction comprising isopentane is drawn from fractionator 27 by means of valved line 28 as a final product. Liquid comprising unconverted normal pentane is drawn from fractionator 27 through valved line 29 and recycled at least in part, by means of valved line 30, to charge line 1.

It is seen that the saturated dicyclic alicyclic hydrocarbon is cycled through the reaction and catalyst separating zone, in the liquid state, together with the fluid catalyst. The effect upon the catalyst flow, it has been found, is particularly advantageous. The presence of the dicyclic alicyclic hydrocarbon not only increases fluidity of the catalyst but aids in transfer of heat thereto, thereby facilitating maintenance of catalyst temperature, flow of the catalyst stream through the system. Its presence furthermore enables substantial reduction in catalyst entrainment and more efficient separation of catalyst from the reactor effluence.

It is often desirable, particularly when utilizing catalysts of the molten salt type, to maintain the Friedel-Crafts type metal halide content of the fluid catalyst as low as possible. The presence of hydrocarbon decomposition reactions to even a relatively small extent generally results in sludging of the active components of such catalyst to a degree that optimum conditions are attained with difficulty, if at all. The use of the binuclear alicyclic hydrocarbon in accordance with the present invention, by suppressing the hydrocarbon decomposition and enabling the further dilution of the catalyst, makes possible successful operation with such catalysts of decreased Friedel-Crafts type metal halide content.

Although isomerization processes executed with the aid of the fluid type catalysts are generally preferably executed in the liquid phase, vapor phase operations are resorted to and are not beyond the scope of the invention. Thus in a modification of the invention, the hydrocarbons to be isomerized are contacted in the vapor state with a liquid mixture comprising an isomerizing catalyst of the fluid type and the saturated dicyclic alicyclic hydrocarbon. Due to the presence in the fluid catalyst of the dicyclic compound which is liquid at the temperature of operation, not only is vapor phase isomerization of the more readily degraded hydrocarbons, having from five to ten carbon atoms to the molecule, possible in the absence of hydrocarbon decomposition, but under conditions in which no separation of decomposition suppressor from hydrocarbons is required and in which any tendency toward catalyst entrainment is substantially suppressed.

Though the process of the invention is applied with particular advantage to the isomerization of the more readily degraded hydrocarbons, treatment of more stable hydrocarbons by contact with the novel liquid admixtures consisting of a fluid isomerization catalyst and a saturated dicyclic alicyclic hydrocarbon under isomerizing conditions is, at times, desirable. In the treatment of the more stable hydrocarbons, hydrocarbon decomposition is not a problem, but the many other advantages over fluid type isomerization catalysts per se, which are inherent in the novel fluid catalyst-containing mixture of the present invention render their use highly desirable. Thus the highly stable hydrocarbons, such as, for example, butane and isobutane, are isomerized with substantially improved efficiency in either vapor or liquid phase by contact under isomerizing conditions with a liquid consisting essentially of a fluid isomerization catalyst in admixture with the saturated dicyclic alicyclic hydrocarbon. In the isomerization of the more stable hydrocarbons, temperatures in excess of those defined for the treatment of the more readily degraded hydrocarbons up to, for example, about 200° C. can be resorted to.

The following example is illustrative of the catalytic isomerization of the more readily degraded paraffin hydrocarbons in the presence of a saturated binuclear alicyclic hydrocarbon in accordance with the invention:

*Example*

In a series of operations hydrocarbon feeds, consisting essentially of normal pentane, were contacted at isomerizing conditions in the liquid phase with a liquid mixture consisting of $AlCl_3$ dissolved in molten $SbCl_3$ and an admixed saturated dicyclic alicyclic hydrocarbon. Reactor effluence was passed consecutively through a catalyst separator and product vaporizer. Liquid separated from reactor effluence and consisting of molten catalyst and admixed binuclear alicyclic hydrocarbon was recycled to the reaction zone throughout the operation. Analysis of the feed, operating conditions, nature and amount of dicyclic alicyclic hydrocarbon added, as well as the carefully observed results obtained in each of the runs are indicated in the following table.

hexane and a fluid aluminum chloride-containing catalyst, thereby converting normal pentane to isopentane in the absence of any substantial hydrocarbon decomposition.

3. A process for the conversion of normal and branched chain paraffinic hydrocarbons containing from five to ten carbon atoms to the molecule to branched and more highly branched chain paraffinic hydrocarbons respectively which comprises contacting said hydrocarbons in the liquid phase in the presence of an added hydrogen halide at isomerizing conditions with a liquid admixture comprising a saturated dicyclic alicyclic hydrocarbon containing saturated alicyclic rings of from five to six carbon atoms and having not more than three carbon atoms in any side-chain substituent attached to the alicyclic rings, said alicyclic hydrocarbon having a substantially higher boiling temperature than said paraffinic hydrocarbons to be converted and being in the liquid state at the condition of execution of the process, and a fluid isomerization catalyst comprising a metal halide of the Friedel-Crafts type in a conversion zone, passing effluence comprising hydrocarbons and catalyst in the liquid state from the conversion zone into a catalyst separating zone, separating a vapor fraction comprising hydrocarbons having from five to ten carbon atoms from a liquid fraction comprising said catalyst and admixed dicyclic hydrocarbon in said catalyst separating zone, and passing said liquid fraction to said conversion zone.

4. A process for the conversion of pentane to isopentane which comprises contacting pentane in admixture with a promoting amount of a hydrogen halide in a conversion zone at isomerizing conditions in the liquid phase with a liquid admixture comprising a fluid aluminum chloride isomerization catalyst containing from about 0.2 percent to about 5 percent by weight of said fluid catalyst of decalin, thereby converting normal pentane to isopentane in the absence of any

| Run No. | 1 | 2 | 3 | 4 |
|---|---|---|---|---|
| Analysis of charge, Wt. per cent: | | | | |
| Isopentane | 7.0 | 7.0 | 12.0 | 12.0 |
| Normal pentane | 89.6 | 89.6 | 86.2 | 86.2 |
| Higher boiling than pentanes | 3.4 | 3.4 | 1.8 | 1.8 |
| Dicyclic alicyclic hydrocarbon added | Cyclohexyl-cyclohexane | ← Decalin → | | |
| Process Conditions: | | | | |
| Temperature, ° C | 80 | 80 | 80 | 80 |
| Catalyst to hydrocarbon ratio by vol | 1:1 | 1:1 | 1:1 | 1:1 |
| HCl added, Wt. per cent of feed | 4.7 | 4.4 | 4.7 | 6.6 |
| Contact time, minutes | 9 | 9 | 9 | 9 |
| Feed rate, kg./hr | 2.04 | 2.1 | 2.1 | 2.0 |
| Pressure, lbs./sq. in | 305 | 330 | 270 | 300 |
| Dicyclic hydrocarbon in initial catalyst charge, wt. per cent | 4.5 | 2.4 | 0.4 | 0.4 |
| Dicyclic hydrocarbon addition rate, grams/kg. of feed | 0 | 0 | 0.7 | 0.9 |
| Results-Total operating period: | | | | |
| Total isopentane in product grams | 4,103 | 7,118 | 2,923 | 5,934 |
| Maximum conversion to isopentane, wt. per cent | 45 | 45 | 32 | 52 |
| Average conversion to isopentane, wt. per cent | 22.5 | 37.5 | 20.1 | 29.4 |
| Average disproportionation to butanes, wt. per cent | 1 | 1.1 | 0.8 | 0.8 |
| Overall catalyst life—grams isopentane/gram $AlCl_3$ | 126 | 244 | 125 | 175 |

I claim as my invention:

1. A process for the conversion of pentane to isopentane which comprises contacting pentane in admixture with a promoting amount of a hydrogen halide at isomerizing conditions with a liquid admixture comprising decalin and a fluid aluminum chloride-containing catalyst, thereby converting normal pentane to isopentane in the absence of any substantial hydrocarbon decomposition.

2. A process for the conversion of pentane to isopentane which comprises contacting pentane in admixture with a promoting amount of a hydrogen halide at isomerizing conditions with a liquid admixture comprising cyclohexyl cyclosubstantial hydrocarbon decomposition in said conversion zone, passing effluence comprising pentanes and a portion of said liquid admixture in the liquid state from said conversion zone into a catalyst separating zone, separating a vapor fraction comprising pentanes from a liquid fraction comprising said catalyst and admixed decalin in said catalyst separating zone, and passing said liquid fraction from said catalyst separating zone to said conversion zone.

5. A process for the conversion of normal and branched chain paraffinic hydrocarbons containing from five to ten carbon atoms to the molecule to branched and more highly branched chain paraffinic hydrocarbons respectively which comprises contacting said hydrocarbons in admixture with a promoting amount of a hydrogen halide in a conversion zone at isomerizing conditions with a liquid admixture comprising a fluid aluminum halide isomerization catalyst containing from about 0.1 percent to about 20 percent by weight of said fluid catalyst of decalin, thereby executing said conversion in the absence of any substantial hydrocarbon decomposition, passing reactor effluent comprising hydrocarbons and catalyst in the liquid state from said conversion zone into a catalyst separating zone, separating a vapor fraction comprising hydrocarbons having from five to ten carbon atoms to the molecule from a liquid fraction comprising said catalyst and admixed decalin in said catalyst separating zone, and passing said liquid fraction from said catalyst separating zone to said conversion zone.

6. A process for the conversion of normal and branched chain paraffinic hydrocarbons containing from five to ten carbon atoms to the molecule to branched and more highly branched chain paraffinic hydrocarbons respectively which comprises contacting said hydrocarbons in the liquid phase in admixture with a promoting amount of a hydrogen halide in a conversion zone with a liquid admixture comprising decalin and a fluid isomerization catalyst comprising a metal halide of the Friedel-Crafts type, thereby executing said conversion in the absence of any substantial hydrocarbon decomposition in said conversion zone, passing effluence comprising hydrocarbons and catalyst in the liquid state from said conversion zone to a catalyst separating zone, separating a vapor fraction comprising hydrocarbons having from five to ten carbon atoms from a liquid fraction comprising said catalyst and admixed decalin in said catalyst separating zone, and passing said liquid fraction from said catalyst separating zone to said conversion zone.

7. A process for isomerizing hydrocarbons which comprises contacting a hydrocarbon fraction comprising at least one paraffinic hydrocarbon having from five to ten carbon atoms to the molecule in the liquid phase in admixture with a promoting amount of a hydrogen halide in a conversion zone at isomerizing conditions with a liquid admixture comprising a saturated dicyclic alicyclic hydrocarbon containing saturated alicyclic rings of from five to six carbon atoms and having not more than three carbon atoms in any side-chain substituent attached to the alicyclic rings, said alicyclic hydrocarbon having a substantially higher boiling temperature than the maximum boiling temperature of said hydrocarbon fraction and being in the liquid state at the conditions of execution of the process, and a fluid isomerization catalyst comprising a metal halide of the Friedel-Crafts type, thereby executing said isomerization in the absence of any substantial hydrocarbon decomposition in said conversion zone, passing effluence comprising hydrocarbons and catalyst in the liquid state from said conversion zone to a catalyst separating zone, separating a vapor fraction comprising hydrocarbons within the boiling range of said hydrocarbon fraction from a liquid fraction comprising said catalyst and admixed dicyclic hydrocarbon in said catalyst separating zone, and passing said liquid fraction from said catalyst separating zone to said conversion zone.

8. A process for the conversion of normal butane to isobutane which comprises contacting normal butane in admixture with a promoting amount of a hydrogen halide in a conversion zone at isomerizing conditions with a liquid admixture comprising a normally liquid saturated dicyclic alicyclic hydrocarbon containing saturated alicyclic rings of from five to six carbon atoms and having not more than three carbon atoms in any side-chain substituent attached to the alicyclic rings, said alicyclic hydrocarbon being in the liquid state at the conditions of execution of the process, and a fluid isomerization catalyst comprising a metal halide of the Friedel-Crafts type, passing effluence comprising hydrocarbons and catalyst from said conversion zone to a catalyst separating zone, separating a vapor fraction comprising butanes from a liquid fraction comprising said catalyst and admixed dicyclic hydrocarbon in said catalyst separating zone, and passing said liquid fraction from said catalyst separating zone to said conversion zone.

9. In a process for isomerizing open chain paraffinic hydrocarbons having from four to ten carbon atoms to the molecule wherein said hydrocarbons are contacted in admixture with a promoting amount of a hydrogen halide at isomerizing condition with a fluid isomerization catalyst comprising a metal halide of the Friedel-Crafts type in a reaction zone, the improvement which comprises maintaining in said fluid catalyst a saturated dicyclic alicyclic hydrocarbon containing saturated alicyclic rings of from five to six carbon atoms and having not more than three carbon atoms in any side-chain substituent attached to the alicyclic rings, said alicyclic hydrocarbon having a substantially higher boiling temperature than said open chain paraffins to be isomerized and being in the liquid state under the condition of execution of the process, passing effluence comprising hydrocarbons and catalyst from said reaction zone into a catalyst separating zone, separating a vapor fraction comprising open chain hydrocarbons from a liquid fraction comprising said catalyst and admixed dicyclic hydrocarbon in said catalyst separating zone, and passing said liquid fraction from said catalyst separating zone to said reaction zone.

WILLIAM E. ROSS.

REFERENCES CITED

The following references are of record in the file of this patent:

UNITED STATES PATENTS

| Number | Name | Date |
|---|---|---|
| 2,220,091 | Evering et al. | Nov. 5, 1940 |
| 2,266,011 | d'Ouville et al. | Dec. 16, 1941 |
| 2,273,159 | Tongberg et al. | Feb. 17, 1942 |
| 2,317,241 | Ackerman et al. | Apr. 20, 1943 |
| 2,350,834 | Sensel et al. | June 6, 1944 |
| 2,355,198 | Atwell | Aug. 8, 1944 |